United States Patent [19]

Spector

[11] 4,421,254
[45] Dec. 20, 1983

[54] WALL-MOUNTED AROMATIC LIQUID DISPENSER ASSEMBLY

[76] Inventor: Donald Spector, 380 Mountain Rd., Union City, N.J. 07087

[21] Appl. No.: 322,086

[22] Filed: Nov. 17, 1981

Related U.S. Application Data

[63] Continuation-in-part of Ser. No. 107,625, Dec. 27, 1979, Pat. No. 4,309,011.

[51] Int. Cl.³ .............................................. B05B 15/00
[52] U.S. Cl. ..................................... 222/180; 222/182
[58] Field of Search ........... 222/402.1, 402.12, 402.13, 222/402.15, 182, 180, 173, 505; 248/467

[56] References Cited

U.S. PATENT DOCUMENTS

| | | | |
|---|---|---|---|
| 3,241,795 | 3/1966 | Frye | 248/467 |
| 4,111,338 | 9/1978 | Cheng et al. | 222/180 |
| 4,171,776 | 10/1979 | Pagliaro | 222/180 |
| 4,223,812 | 9/1980 | van Lit | 222/180 |

Primary Examiner—Stanley H. Tollberg
Attorney, Agent, or Firm—Michael Ebert

[57] ABSTRACT

An aromatic liquid dispenser assembly in which a spray can having a depressible actuating pin projecting from the upper end thereof is held by a fixture in an upright position against a wall, the fixture and the can being disposed within and concealed by a cover plate pivoted on the fixture and having a rocker formation. The plate is operatively linked to the pin, whereby when it is rocked, it acts to depress the pin to produce an aromatic liquid spray that is discharged through openings in the cover plate. The wall-mounted assembly simulates the appearance of a conventional light switch and is operated in a similar manner, thereby disguising the nature and purpose of the dispenser and making operation there possible at any time without social embarrassment.

7 Claims, 5 Drawing Figures

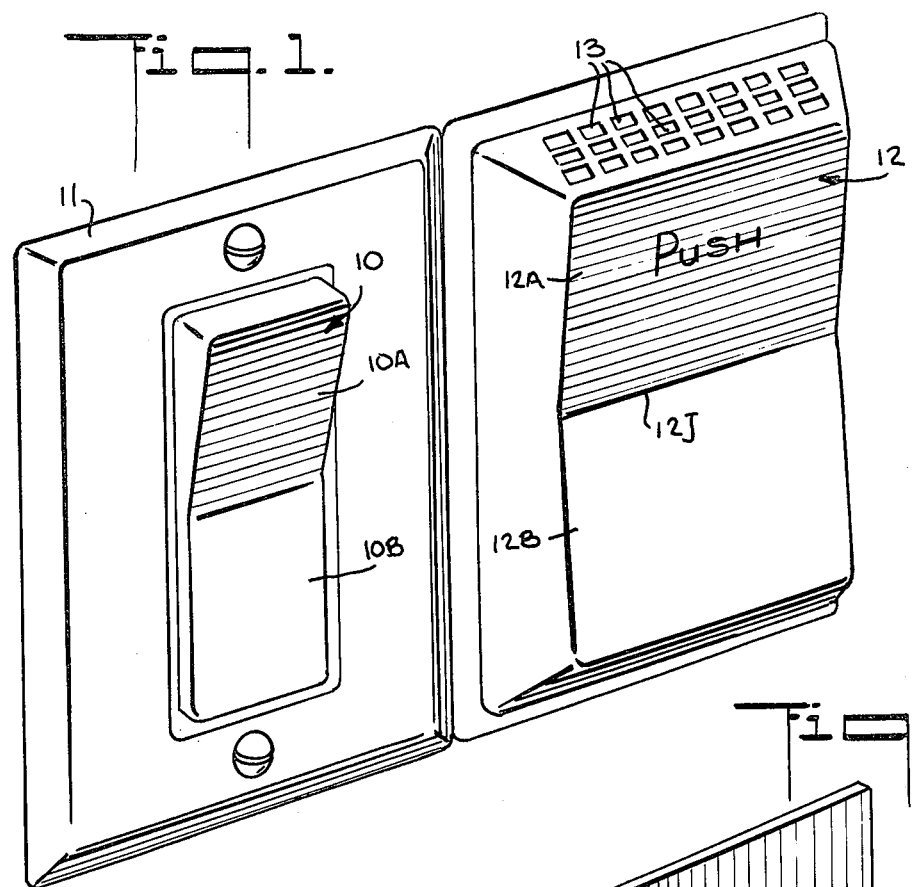
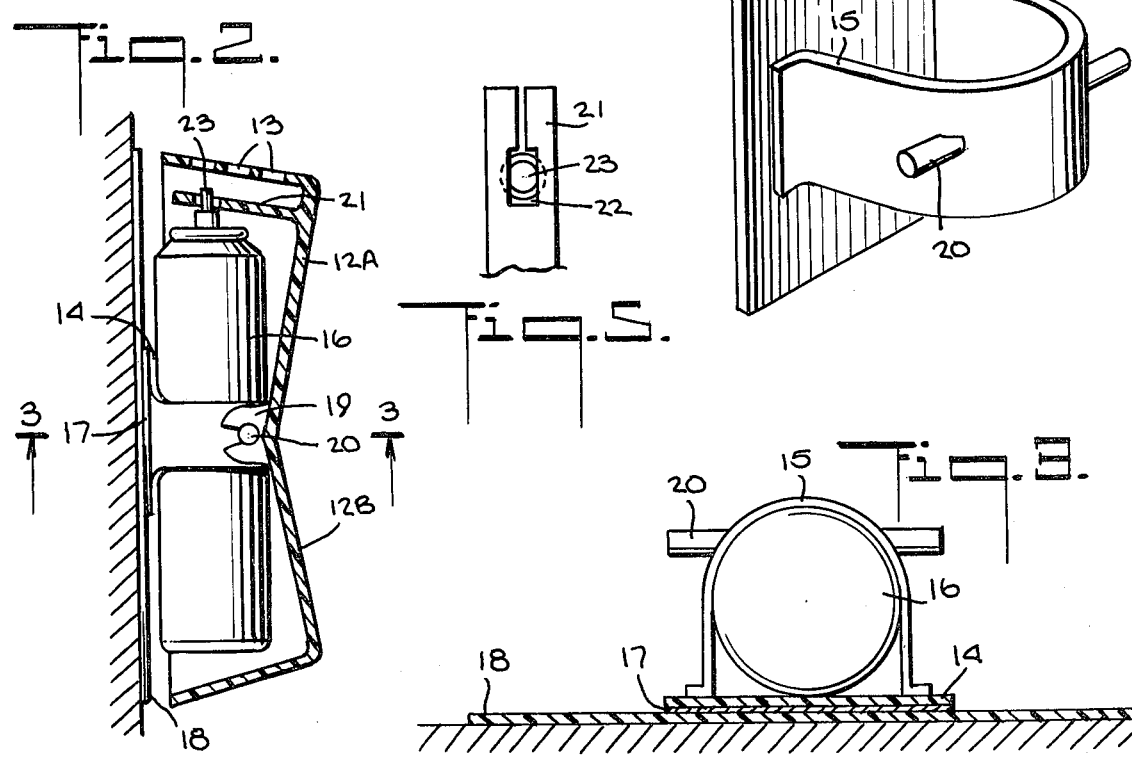

WALL-MOUNTED AROMATIC LIQUID DISPENSER ASSEMBLY

RELATED APPLICATION

This application is a continuation-in-part of my copending application Ser. No. 107,625, filed Dec. 27, 1979, entitled "Adhesive Mounting for Wall Fixtures" now U.S. Pat. No. 4,309,011.

BACKGROUND OF INVENTION

This invention relates generally to aromatic liquid dispensers and in particular to a wall-mounted assembly in which a spray can is concealed within a pivoted cover plate to simulate the appearance of a conventional light switch, the dispenser being operated by a switch-like action.

The term "aromatic liquid" as used herein is not limited to liquids which when sprayed into the atmosphere provide a pleasant or perfumed odor, for the term is intended to encompass all liquids which when discharged act to condition, modify or otherwise change the atmosphere, such as air fresheners, deodorizers and insecticides.

Ther term "Spray Can" as used herein includes any container or canister for an aromatic liquid which includes a depressible actuating pin which when operated emits an upward liquid spray. The can may be of the aerosol type, in which case it is pressurized, or it may be unpressurized, in which case it includes a pump operated by the actuating pin.

Aromatic liquid spray cans have many uses in the home, the office or in any other environment where there is a need to render the atmosphere more agreeable. Thus spray cans may be used to mask the odor of tobacco smoke, to emit insecticides and to in other respects improve or alter the atmospheric conditions prevailing in a room. Yet there are circumstances where it is socially undesirable or embarrassing to operate a spray can.

Thus when company is present in a living room, it is socially unseemly for the hostess to openly operate a spray can, even though the room may be filled with tobacco smoke or otherwise be in need of refreshing. Nor would it be proper for a guest in someone's else's bathroom to make use of a spray can to freshen the air.

These inhibitions against the open use of spray cans, though perhaps somewhat Victorian, still prevail, and however acute the need for an air freshener or deodorizer, one is often unable to take advantage of the effective products now available for enhancing the atmosphere of a room.

The present invention provides a wall-mounted spray can assembly by which wall mounting is preferably effected by the adhesive system disclosed in my above-identified copending application whose entire disclosure is incorporated herein by reference. In this adhesive system, use is made of a wall sheet of flexible film whose undersurface has a layer of pressure-sensitive adhesive thereon whereby the sheet may be pressed against the wall at a desired installation site and intimately conformed thereto. Also provided is a fixture having a flat base whose area is much smaller than that of the sheet, the base having a pressure sensitive layer thereon, making it possible to press the fixture against the exposed surface of the sheet in the central zone thereof to form a strong bond therewith.

The wall sheet may be readily peeled from the wall without in any way impairing the wall surface, so that one may readily remove the adhesive system from the wall. On the other hand, the bond between the wall sheet and the fixture is difficult to break, so that even a heavy load imposed on the fixture will not dislodge it from the wall. Because adhesive contact with the wall surface is only by way of the wall sheet, this large area coupling is highly resistant to shear and bending forces.

SUMMARY OF INVENTION

In view of the foregoing, the main object of this invention is to provide a wall-mountable aromatic liquid spray can assembly which simulates the appearance of a conventional light switch and which is operated in a similar manner, thereby disguising the nature and purpose of the assembly and making it possible to operate the dispenser at any time even under circumstances under which such operation is normally socially undesirable.

A significant feature of the invention is that the assembly may be installed on a wall at any site thereon without the need for screws or other anchoring devices requiring the drilling of holes in the wall, yet the assembly, though firmly anchored, may be quickly removed from the wall without damage thereto.

Also an object of the invention is to provide a spray can assembly having the approximate dimensions of a conventional light switch cover plate and which may be juxtaposed to a light switch, so that one can when turning on the light also actuate the spray can to both light the room and freshen the atmosphere of the room.

Yet another object of the invention is to provide a spray can assembly which may be manufactured and sold at low cost, and which may be disposed of when the can is exhausted.

Briefly stated, these objects are attained in an assembly including a fixture having a flat base that is attachable to a wall, a yoke mounted on the base and embracing an aromatic liquid spray can having an actuating pin projecting from its upper end, the can being held against the wall by the fixture in an upright position.

Concealing the can and fixture is a cover plate having oppositely inclined upper and lower sections in a rocker formation whose pivot axis is parallel to the junction of these sections. The cover plate is operatively linked to the actuating pin, whereby when the plate is rocked in, the pin is depressed to spray liquid toward openings in the upper end of the plate, thereby discharging the liquid into the room.

The assembly simulates the appearance of a conventional light switch and is operated in a similar manner so that its nature and function are disguised. The fixture is preferably attached to the wall by an adhesion system of the type disclosed in my above-identified copending application.

OUTLINE OF DRAWINGS

For a better understanding of the invention as well as other objects and further features thereof, reference is made to the following detailed description to be read in conjunction with the accompanying drawings, wherein:

FIG. 1 shows in perspective in side-by-side relation on a wall, a conventional light switch and an aromatic liquid spray can assembly in accordance with the invention;

FIG. 2 is a side view section of the assembly;

FIG. 3 is a transverse section taken in the plane indicated by lines 3—3 in FIG. 2;

FIG. 4 is a perspective view of the fixture included in the assembly; and

FIG. 5 illustrates in plan view a portion of the link member coupling the pivoted cover plate of the assembly to the actuating pin of the spray can.

DESCRIPTION OF INVENTION

Referring now to FIG. 1, there is shown mounted on a vertical wall a conventional electric light switch having a manually-operated toggle 10 and a rectangular cover plate 11 screwed onto the switch, the plate having a window to expose the toggle. The toggle has a rocker formation so that the upper section 10A in the "off" state of the switch is tipped outwardly and the lower section 10B is tipped inwardly, these conditions being reversed when the upper section is depressed to produce a snap action putting the switch in its "on" state.

An assembly in accordance with the invention as shown in FIG. 1, has a cover plate 12 whose rectangular dimensions are about the same as cover plate 11 of the switch. The cover plate has a rocker formation similar to that of toggle 10 and provided with an inclined upper section 12A and an oppositely inclined lower section 12B, the transverse line 12J representing the junction of these sections. The flanged upper end of the upper section 12A is provided with an array of openings 13.

The upper section 12A of the cover plate bears the instructions "PUSH", the operation of the assembly being such that when the upper section is pressed to rock the pivoted cover, an aromatic liquid is discharged through openings 13 into the room.

Thus the assembly in appearance simulates the appearance of a conventional light switch and is operated in a similar fashion. By juxtaposing the assembly to the light switch, one is able to conveniently operate them both at about the same time, so that when turning on the light one can also discharge an aromatic liquid into the room to freshen the air.

Referring now to FIGS. 2, 3, and 4, it will be seen that concealed under the cover plate 12 of the assembly is a fixture having a square base 14 on which is mounted a yoke 15 which embraces a spray can 16 at about its midpoint. The base is attached to the wall and holds the spray can in an upright position thereagainst.

Attached to the undersurface of base 14 is a double-faced adhesive pad 17 of the type available commercially from the 3M Company, this pad being formed of flexible foam plastic having a pressure-sensitive layer on either side thereof, one side being adhered to the underface of the base. The other side is adhered to the central zone rectangular wall of a sheet 18 formed of flexible plastic film material such as PVC, whose underface is coated with a layer of pressure-sensitive adhesive, the dimensions of the sheet being about the same as cover plate 12 so that this sheet is also concealed by the cover plate. Material suitable for the wall sheet is marketed commercially under the "Contact Paper" trademark.

In practice, wall sheet 18 is adhered to the wall at a selected site thereon, the sheet conforming thereto even when the wall surface is uneven. Thereafter, the fixture is adhesively anchored onto the center zone of the sheet. While the adhesive contact between the sheet and the wall surface may be relatively weak per unit area, because this contact is spread over a relatively large wall surface area, the sheet is highly resistant to any applied shearing force.

The shearing force imposed on the sheet is that produced by the loaded fixture thereon, the fixture supporting both the spray can 10 and cover 12. There is also a bending moment produced by this load which seeks to move the base 14 of the fixture about its point of connection to the sheet. However, since the load only projects a short distance from the base of the fixture, the bending moment is quite small. Thus even heavy downward load forces imposed on the fixture and translated into shear and bending forces will not act to displace the base sheet, and the assembly will be firmly anchored in place. Yet the entire assembly may be quickly removed simply by peeling off the sheet from the wall.

Cover plate 12 is provided on the inside with a pair of slotted bearings 19 in alignment with the junction 12J between the upper and lower sections 12A and 12B. These bearings snap onto a pair of pivot pins 20 projecting from opposite sides of yoke 15 so that cover plate 12 is then pivoted to rock about an axis parallel to junction line 12J.

Upper section 12A is provided within its interior with a link member 21 whose free end as shown in FIG. 5 is bifurcated to form a pair of flexible tines leading into a slot 22 to accommodate the actuating pin 23 projecting axially from the upper end of spray can 16. In practice, the entire cover plate including link member 21 and bearings 19 may be injection molded so that the link member and bearings are integral therewith and may be coupled to actuating pin 23 and to pivot pin 20 simply by pushing in the cover plate to cause the link member 21 and the bearings 19 to snap into their operative positions.

Thus when the cover plate is rocked in, link member 21 swings downwardly to depress pin 23, causing the aromatic liquid to spray upwardly and to be discharged through openings 13 in the cover.

The entire assembly may be removed from the wall and discarded after the spray can is spent simply by peeling the wall sheet off the wall. However, the assembly may be made in a non-disposable version with the fixture permanently screwed in the wall, so that when the spray can is exhausted, one then retracts the cover from the fixture and replaces the can with a fresh can, after which the cover is put back on the fixture. While there has been shown and described a preferred embodiment of a WALL-MOUNTABLE AROMATIC LIQUID DISPENSER ASSEMBLY in accordance with the invention, it will be appreciated that many changes and modifications may be made therein without, however, departing from the essential spirit thereof.

I claim:

1. A wall-mountable aromatic liquid dispenser assembly comprising:
   A. a spray can containing an aromatic liquid and provided at its upper end with an upright actuating pin which when depressed axially acts to spray the liquid upwardly;
   B. a fixture having a flat base attachable to a wall and a yoke mounted on the base and embracing the can to hold it in an upright position;
   C. a single piece cover plate provided with oppositely-inclined upper and lower sections in a rocker formation simulating the appearance of a standard electric toggle switch, the plate being pivotally mounted on the fixture on an axis parallel to the junction line between the sections and covering and concealing the fixture and the can, said plate having vents therein above said actuating pin; and D. means operatively linking the cover plate and the pin whereby when the plate is rocked the pin is depressed to discharge the resultant spray through the openings, said means being constituted by a link member cantilevered from the inner wall of the upper section, the free end of the member having a slot therein through which the pin projects.

2. An assembly as set forth in claim 1, wherein said can is of the pressurized aerosol type.

3. An assembly as set forth in claim 1, wherein said can is unpressurized and includes a pump operated by said pin.

4. An assembly as set forth in claim 1, wherein said plate is provided at the ends of said junction line with a pair of bearings which receive pivot pins projecting along said axis from opposite sides of the yoke.

5. An assembly as set forth in claim 1, wherein the linkage means is constituted by a link member cantilevered from the inner wall of the upper section, the free end of the link member being coupled to the pin.

6. An assembly as set forth in claim 1, wherein said fixture base is provided with an adhesive pad which is adherable to the central zone of a wall sheet of larger area adhered to said wall by a pressure sensitive layer whereby the sheet may be peeled off the wall.

7. An assembly as set forth in claim 1 wherein said cover plate is approximately the size of the cover plate of a standard electric light wall switch.

* * * * *